US008290437B2

(12) United States Patent
Simons et al.

(10) Patent No.: US 8,290,437 B2
(45) Date of Patent: Oct. 16, 2012

(54) LOCATING REFERENCE NODES FOR POSITIONING DEVICES IN A WIRELESS NETWORK

(75) Inventors: Paul Richard Simons, Redhill (GB); Stephen Michael Pitchers, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 324 days.

(21) Appl. No.: 12/439,224

(22) PCT Filed: Aug. 29, 2007

(86) PCT No.: PCT/IB2007/053477
§ 371 (c)(1),
(2), (4) Date: Sep. 24, 2009

(87) PCT Pub. No.: WO2008/029326
PCT Pub. Date: Mar. 13, 2008

(65) Prior Publication Data
US 2010/0035546 A1      Feb. 11, 2010

(30) Foreign Application Priority Data

Sep. 6, 2006   (EP) ..................................... 06120233

(51) Int. Cl.
*H04B 7/00* (2006.01)
(52) U.S. Cl. .................. 455/41.2; 455/456.1; 455/456.3; 342/458; 342/463
(58) Field of Classification Search ................. 455/41.2, 455/456.1, 456.3; 342/458, 463, 464, 465
See application file for complete search history.

(56) References Cited

U.S. PATENT DOCUMENTS

| 7,181,195 | B2 * | 2/2007 | Booth et al. ................... 455/411 |
| 7,239,277 | B2 * | 7/2007 | Fullerton et al. .............. 342/458 |
| 7,421,466 | B2 * | 9/2008 | Haines .......................... 709/200 |
| 8,005,879 | B2 * | 8/2011 | Bornhoevd et al. ........... 707/899 |

(Continued)

FOREIGN PATENT DOCUMENTS

EP    1455482 A1    9/2004

(Continued)

OTHER PUBLICATIONS

Hung-Chi Chu et al; "A GPS-Less Self-Positioning Method for Sensor Networks", Proceedings of the 2005 11th Intl. Conf. on Parallel and Distributed Systems, The Comuter Society.

(Continued)

*Primary Examiner* — Tuan H Nguyen
(74) *Attorney, Agent, or Firm* — Mark L. Beloborodov

(57) ABSTRACT

A method for matching an actual device in a wireless network to a corresponding device indicated in a plan of such devices is provided. The method is suitable for initiating the commissioning process for a lighting control network or an automated home network and it enables the program controlling the system to establish a number of reference nodes, with respect to which the coordinates of the rest of the nodes in the network are established, without the engineer having to manually enter the identification details of the reference nodes in the computer system. The method includes identifying a device in the plan having unique characteristics compared to the other devices in the plan, receiving data comprising the characteristics of the actual device from the wireless network, and in response to the characteristics of the actual device including the unique characteristics, matching the physical device with the identified device.

16 Claims, 11 Drawing Sheets

U.S. PATENT DOCUMENTS

2005/0228613 A1 10/2005 Fullerton et al.

FOREIGN PATENT DOCUMENTS

| EP | 1480495 | A2 | 11/2004 |
| EP | 1696711 | A2 | 8/2006 |
| WO | 2004057927 | A1 | 7/2004 |
| WO | 2006095317 | A1 | 9/2006 |

OTHER PUBLICATIONS

Hongyi Wu et al; "Novel Self-Configurable Positioning Technique for Multihop Wireless Networks", IEEE/ACM Transactions on Networking, vol. 13, No. 3, Jun. 2005, pp. 609-621.

* cited by examiner

FIG. 9

| | 101 (8) | 102 (6) | 103 (7) | 104 (8) | 105 (3) | 106 (4) | 107 (7) | 108 (7) | 109 (10) | 110 (8) | 111 (3) | 112 (8) | 113 (7) | 114 (3) | 115 (6) |
|---|---|---|---|---|---|---|---|---|---|---|---|---|---|---|---|
| 101 (8) | | 5.52 | 3.16 | 2.83 | 2.42 | 1.80 | 5.89 | X | X | 2.00 | X | 2.83 | X | X | X |
| 102 (6) | 5.52 | | X | 6.14 | 5.25 | 6.93 | 0.50 | X | X | 4.29 | X | 2.69 | X | 6.00 | X |
| 103 (7) | 3.16 | X | | 3.16 | 5.20 | 3.10 | X | X | X | 4.36 | X | 5.83 | X | X | X |
| 104 (8) | 2.83 | 6.14 | 3.16 | | 5.16 | 4.29 | X | X | X | 2.00 | X | 4.00 | X | X | X |
| 105 (3) | 2.42 | 5.25 | 5.20 | 5.16 | | 2.20 | 5.73 | X | X | 3.72 | X | 3.01 | X | X | X |
| 106 (4) | 1.80 | 6.93 | 3.10 | 4.29 | 2.20 | | 7.36 | X | X | 3.80 | X | 4.29 | X | X | X |
| 107 (7) | 5.89 | 0.50 | X | X | 5.73 | 7.36 | | X | 7.80 | 4.55 | X | 3.08 | X | 6.50 | X |
| 108 (7) | X | X | X | X | X | X | X | | X | X | 0.10 | X | X | X | X |
| 109 (10) | X | X | X | X | X | X | 7.80 | X | | X | X | 2.00 | 1.20 | 1.40 | 1.00 |
| 110 (8) | 2.00 | 4.29 | 4.36 | 2.00 | 3.72 | 3.80 | 4.55 | X | X | | X | 2.00 | X | X | X |
| 111 (3) | X | X | X | X | X | X | X | 0.10 | X | X | | X | X | X | X |
| 112 (8) | 2.83 | 2.69 | 5.83 | 4.00 | 3.01 | 4.29 | 3.08 | X | 2.00 | 2.00 | X | | X | X | X |
| 113 (7) | X | X | X | X | X | X | X | X | 1.20 | X | X | X | | 2.50 | 0.50 |
| 114 (3) | X | 6.00 | X | X | X | X | 6.50 | X | 1.40 | X | X | X | 2.50 | | 2.40 |
| 115 (6) | X | X | X | X | X | X | X | X | 1.00 | X | X | X | 0.50 | 2.40 | |

FIG. 10

| | 3a | 3b | 3c | 4 | | 6b | 6c | | 7a | 7b | 7c | 7d | 8a | 8b | 8c | 8d | | 10 |
|---|---|---|---|---|---|---|---|---|---|---|---|---|---|---|---|---|---|---|
| 3a | | X | X | 2.20 | | X | 5.25 | | 5.20 | 5.73 | X | X | 2.42 | 5.16 | 3.72 | 3.01 | | 10 |
| 3b | X | | 2.40 | X | | X | 6.00 | | X | 6.50 | X | 2.50 | X | X | X | X | | X |
| 3c | X | 2.40 | | X | | X | X | | X | X | 0.10 | X | X | X | X | X | | 1.40 |
| 4 | 2.20 | X | X | | | X | 6.93 | | 3.10 | 7.36 | X | X | 1.80 | 4.29 | 3.80 | 4.29 | | X |
| 6b | X | X | X | X | | | X | | X | X | X | 0.50 | X | X | X | X | | 1.00 |
| 6c | 5.25 | 6.00 | X | 6.93 | | X | | | X | X | 0.50 | X | 5.52 | 5.80 | 3.80 | 1.80 | | X |
| 7a | 5.20 | X | X | 3.10 | | X | X | | | X | X | X | 3.16 | 3.16 | 4.36 | 5.83 | | X |
| 7b | 5.73 | 6.50 | X | 7.36 | | X | X | | X | | X | X | 5.89 | 6.32 | 4.55 | 3.08 | | 7.80 |
| 7c | X | X | 0.10 | X | | X | 0.50 | | X | X | | X | X | X | X | X | | X |
| 7d | 2.50 | X | X | X | | 0.50 | X | | X | X | X | | X | X | X | X | | 1.20 |
| 8a | 2.42 | X | X | 1.80 | | X | 5.52 | | 3.16 | 5.89 | X | X | | 2.83 | 2.00 | 2.83 | | X |
| 8b | 5.16 | X | X | 4.29 | | X | 5.80 | | 3.16 | 6.32 | X | X | 2.83 | | 2.00 | 2.00 | | X |
| 8c | 3.72 | X | X | 3.80 | | X | 3.80 | | 4.36 | 4.55 | X | X | 2.00 | 2.00 | | 4.00 | | X |
| 8d | 3.01 | X | X | 4.29 | | X | 1.80 | | 5.83 | 3.08 | X | X | 2.83 | 2.00 | 4.00 | | | 2.00 |
| 10 | X | 1.4 | X | X | | 1.00 | X | | X | 7.80 | X | 1.20 | X | X | X | X | | |

LOCATING REFERENCE NODES FOR POSITIONING DEVICES IN A WIRELESS NETWORK

This application is a national stage application under 35 U.S.C. §371 of International Application No. PCT/IB/2007/053477 filed on Aug. 29, 2007, and published in the English language on Mar. 13, 2008, as International Publication No. WO2008/029326, which claims priority to European Application No. 06120233.9, filed on Sept. 6, 2006, incorporated herein by reference.

The invention relates to device configuration in a network. Particularly, it relates to a method and apparatus for matching an actual device in a wireless network to a corresponding device in a plan of such devices.

Lighting control systems are becoming commonplace in commercial and domestic establishments. Many of these systems comprise devices that can communicate wirelessly, which introduces increased flexibility in the system since all the links are fully programmable. The lighting control systems are typically installed in accordance with a detailed building plan indicating the location of each device. The information in the building plan is stored in records in a database used by a program for controlling the system. The records also include the functionality of each device, which has either been manually entered or derived using algorithms of the program. In order for the program to communicate with the nodes of the network, the identification number (ID) of each node needs to be added to the record corresponding to that node. The process for matching each node stored in the computer program with the ID of the actual node in the network is typically performed after the installation of the system has been completed. It typically includes a lighting engineer reading off the barcode of each installed device and manually entering the ID for each device in the system using a graphical user interface. To remember which ID or barcode corresponded to each device at the time of entering the IDs, the bar codes are typically pasted on a print out of the building plan such that the IDs can be entered in the program at a later time. However, this process is time-consuming and prone to errors. There is therefore a need to automate this process.

Patent Application No. IB 2006/050721 describes the automated commissioning of a wireless lighting system by triangulating range measurements from known devices within a network and matching these devices in the system to corresponding records in the building plan. Once a position of a new device is established it can be used as an additional reference point. This process can continue until all the devices in a whole floor or building are identified. However, to begin this process, the commissioning typically requires at least three devices in the system with known coordinates that can act as reference points which can be used to locate other devices. These reference points are usually established by the installation engineer using the conventional method, i.e. the engineer obtains the barcodes for the three reference points, finds the records for the devices in the memory of a computer used for carrying out the commissioning and stores the IDs in the relevant records. After the reference points have been established, the automatic commissioning can start.

Moreover, sometimes it is desired to have more than three reference points, for example, if some of the reference points are located outside the transmission range of a particular device. The step of establishing the reference points is time-consuming and error-prone. Moreover, the higher the number of reference points required, the larger the likelihood of an error.

US 2005/0228613 also discloses a method of determining the position of nodes in a network with respect to reference nodes with known positions in the network.

The invention addresses the issues discussed above.

According to the invention, there is provided a method of matching an actual device in a wireless network to a corresponding device indicated in a plan of such devices, the method comprising: identifying a device in the plan having unique characteristics compared to the other devices in the plan; receiving data comprising the characteristics of the actual device from the wireless network; and in response to the characteristics of the actual device including the unique characteristics, matching the physical device with the identified device.

The plan may comprise a record for each device indicating the coordinates of that device in a coordinate system. The received data may include a unique ID of said actual device and the method may further comprise storing the unique ID in the record of the identified device.

Consequently, the invention provides a method of establishing reference nodes without requiring a user to read the barcodes off the nodes and entering the IDs manually in the computer system.

The unique characteristic may comprise a unique type of the device or a unique distance range to another device in the system. The received data from said actual device may include the type of said actual device and the range measurements between said actual device and its neighbours. The type may include at least one of the make, model and number of end points of said actual device.

For example, one device may be identified since it is the only luminaire of a specific model in the system and a switch may be identified since it is the switch located closest to the identified luminaire out of all switches in the system.

The range measurements may be obtained by analysing signals sent from the actual device to its neighbours or signals sent from the neighbours to the actual device.

According to the invention, there is also provided a computer program comprising computer executable instructions that when executed by a processor causes the processor to perform the method as defined above.

Yet further, according to the invention there is also provided an apparatus comprising: means for connecting to a wireless network; a memory for storing information corresponding to a plan of devices in said wireless network; means for identifying a device in the plan having unique characteristics compared to the other devices in the plan; means for receiving data comprising the characteristics of the actual device from the wireless network; and means for matching the actual device to the identified device if the characteristics indicated in the received data from the actual device include the unique characteristics.

The information corresponding to a plan of devices may include a record for each device indicating the coordinates of each device in a coordinate system. The received data may include a unique ID of said actual device and the means for matching are operable to store the unique ID in the record of said identified device.

The unique characteristics may comprise a unique type of the device or a unique distance range to another device in the system. The received data from said actual device may include the type of said actual device and the distance measurements between said actual device and its neighbouring devices.

The wireless system may be a lighting system or a home automation network. The apparatus may be a personal computer.

The apparatus may form part of a system comprising a plurality of devices connected in a wireless network, the plurality of devices comprising at least one gateway operable to communicate with the apparatus. The gateway may be configured to communicate with said apparatus over a LAN link. The plurality of devices may comprise a plurality of ZigBee devices.

Embodiments of the invention will now be described, by way of example, with reference to the accompanying drawings, in which.

Figure 7:
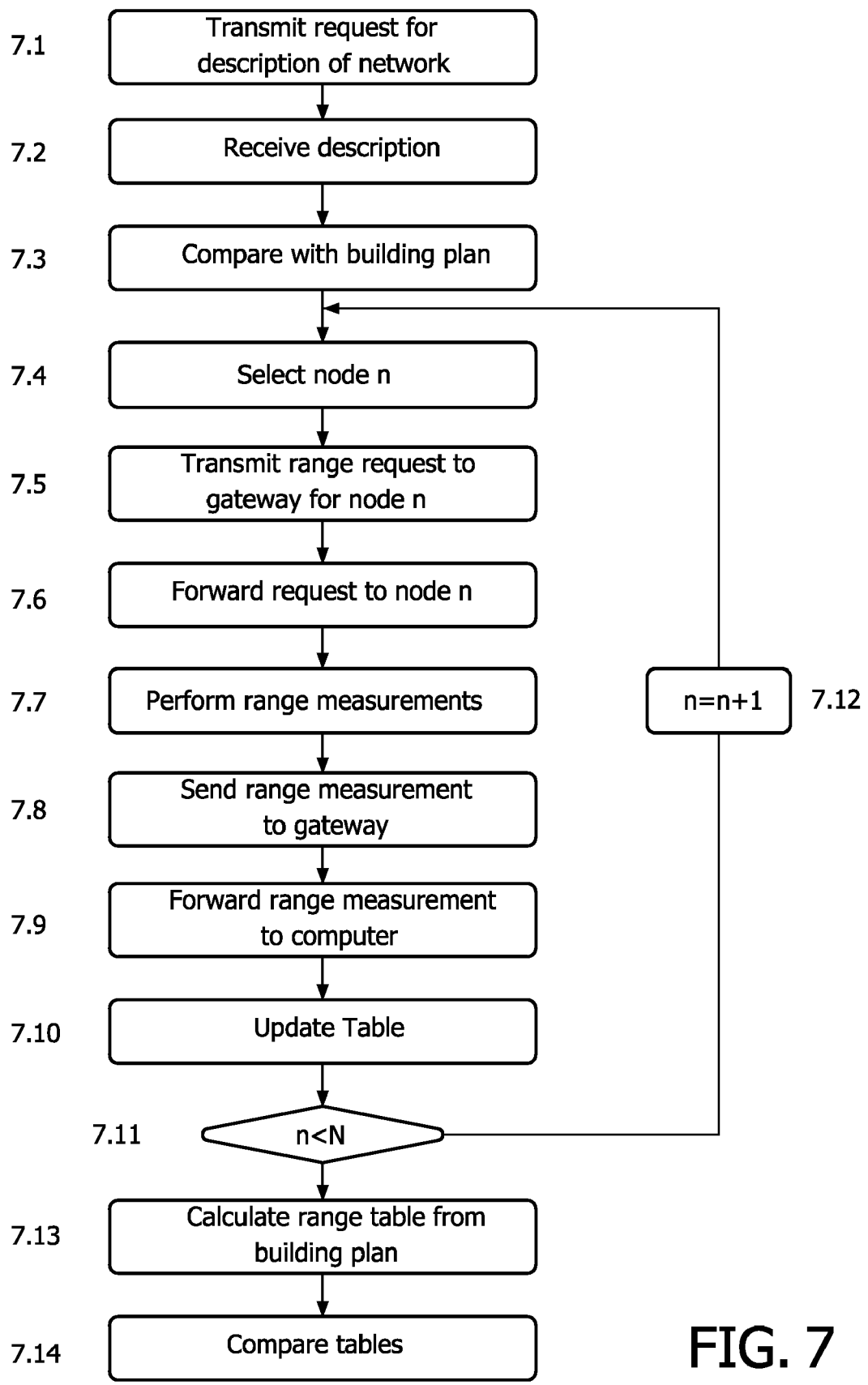
FIG. 7 illustrates a method of commencing the commissioning process according to the invention.
Figure 8:
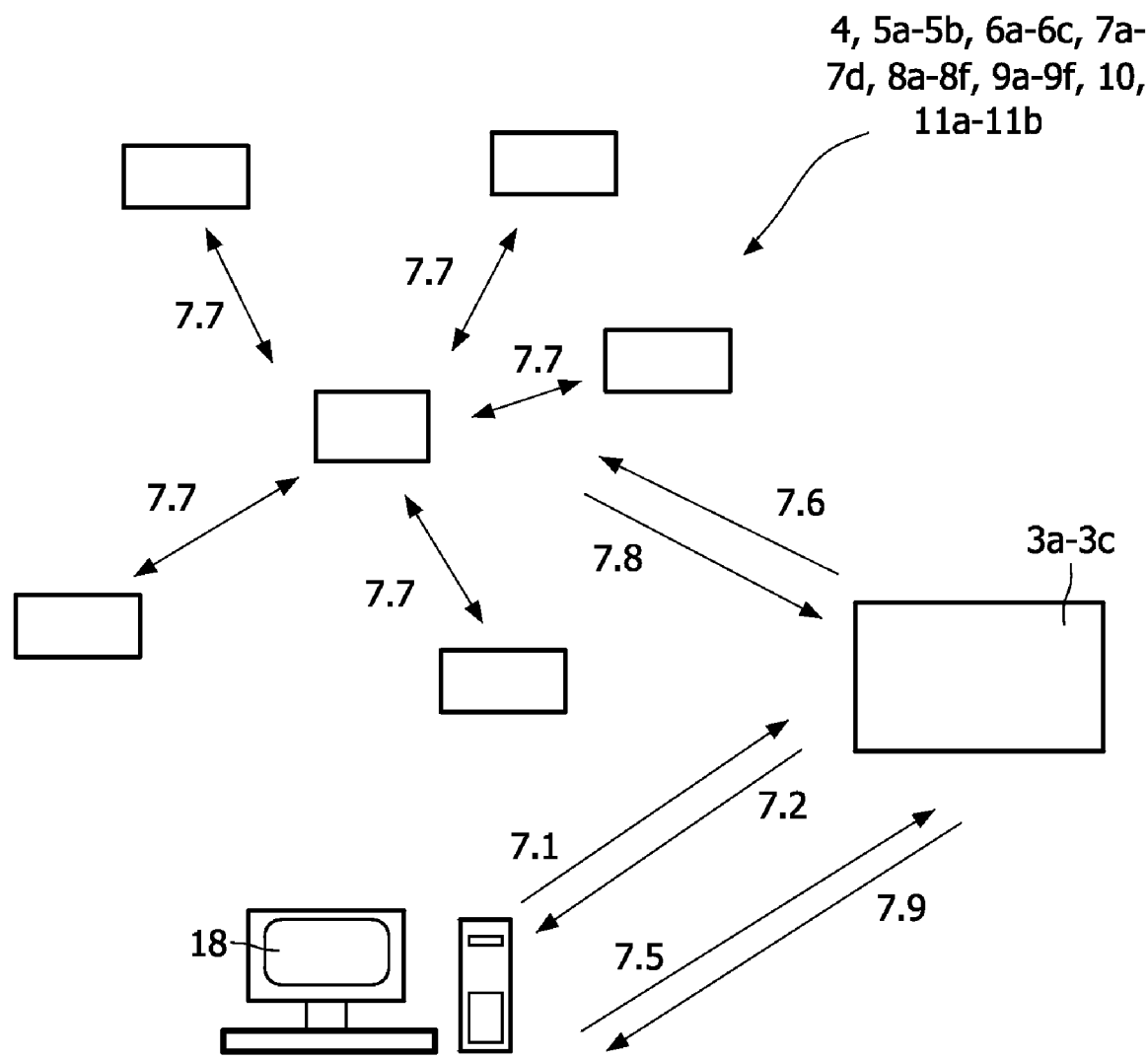
Figure 11:
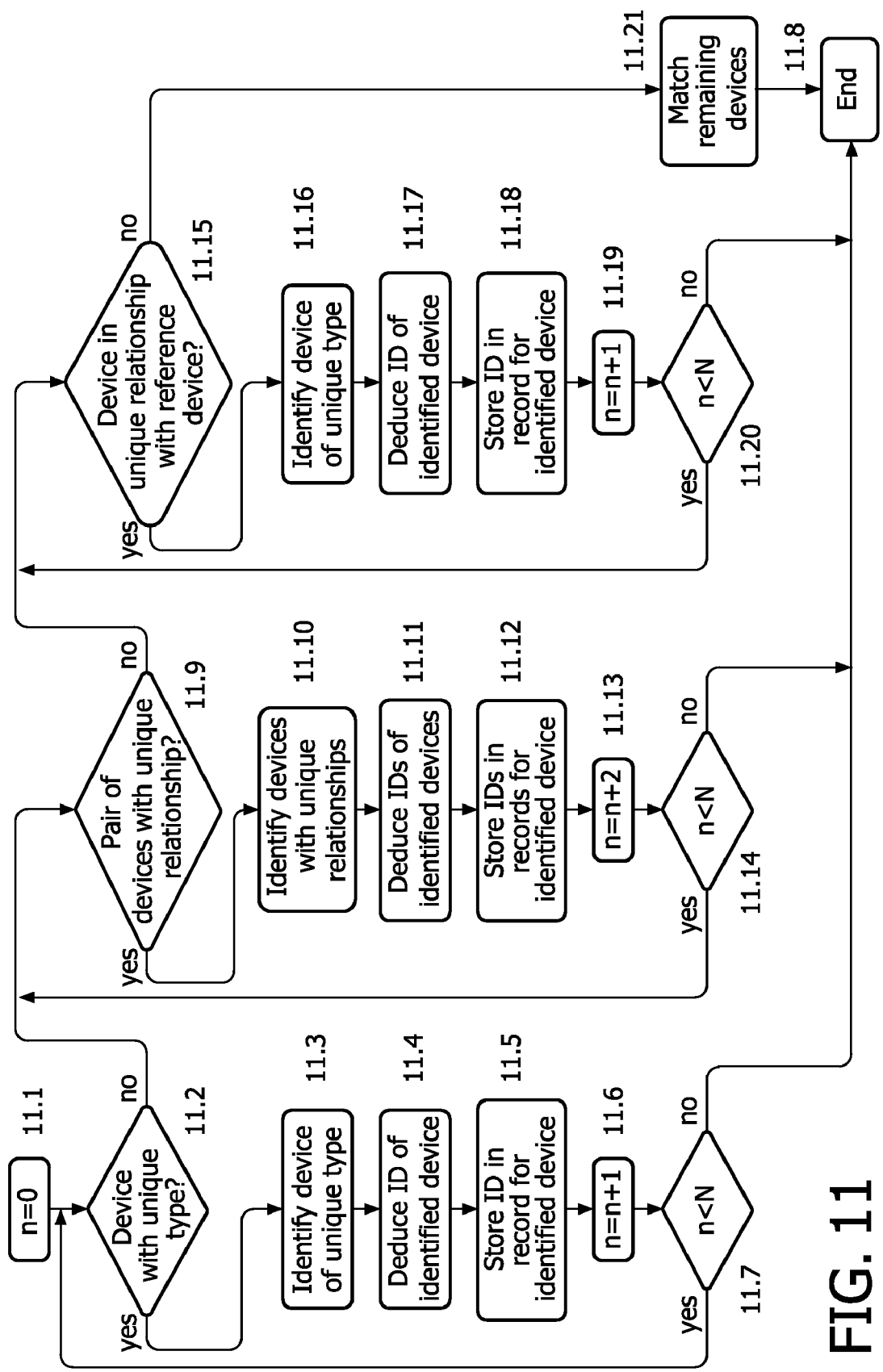
Figure 12:
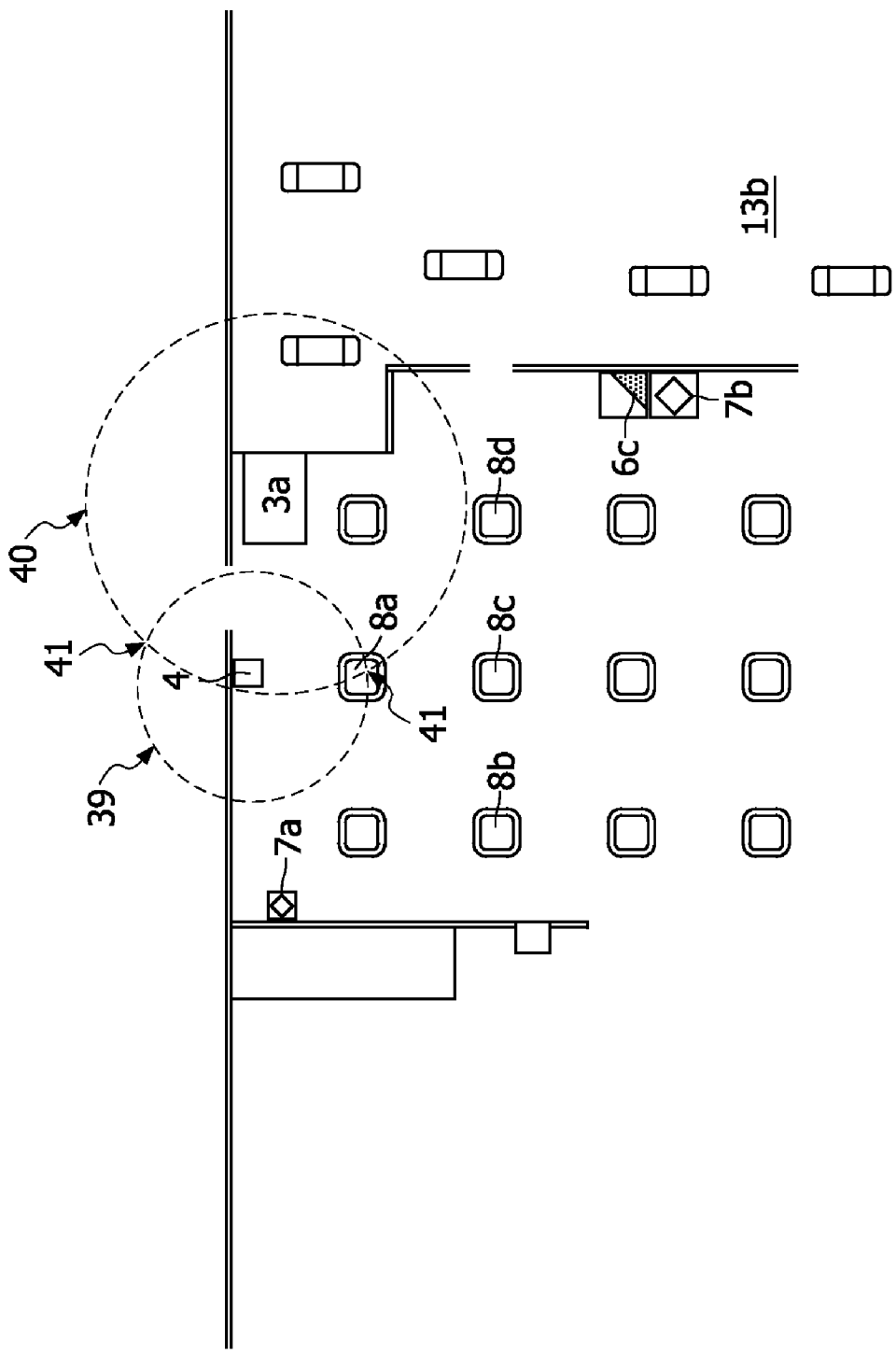
Figure 13:
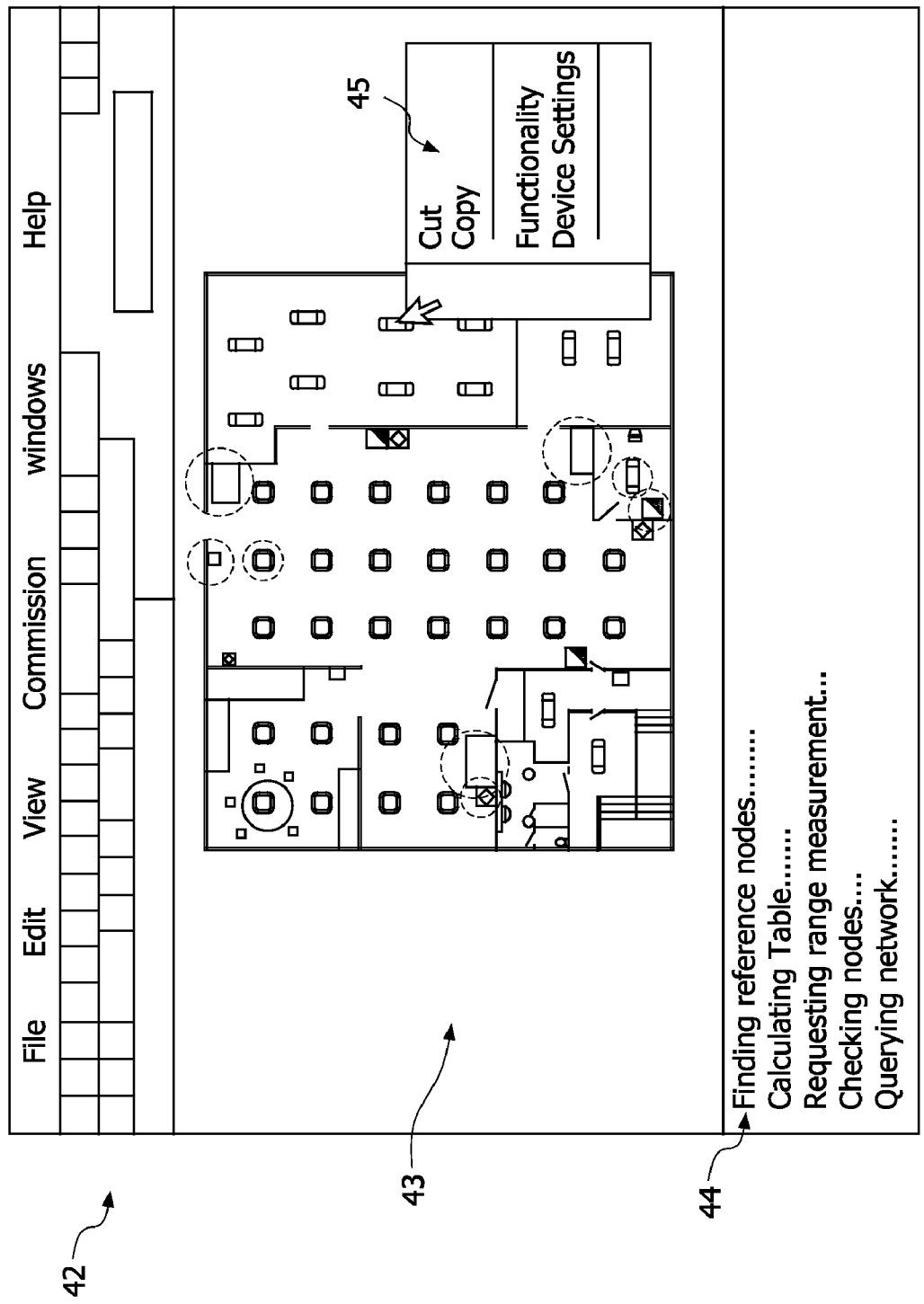

FIG. 8 schematically shows some of the nodes between which messages are sent to perform the method illustrated in FIG. 7;

FIG. 9 shows a table listing the range measurements between nodes in the system;

FIG. 10 shows a table listing the calculated distances between the nodes indicated in the building plan;

FIG. 11 shows a process of establishing reference nodes according to the invention;

FIG. 12 illustrates one way of establishing the coordinates of a node in the system with respect to a number of reference nodes;

FIG. 13 is an example of a graphical user interface for commissioning the lighting control system.

Figure 1:
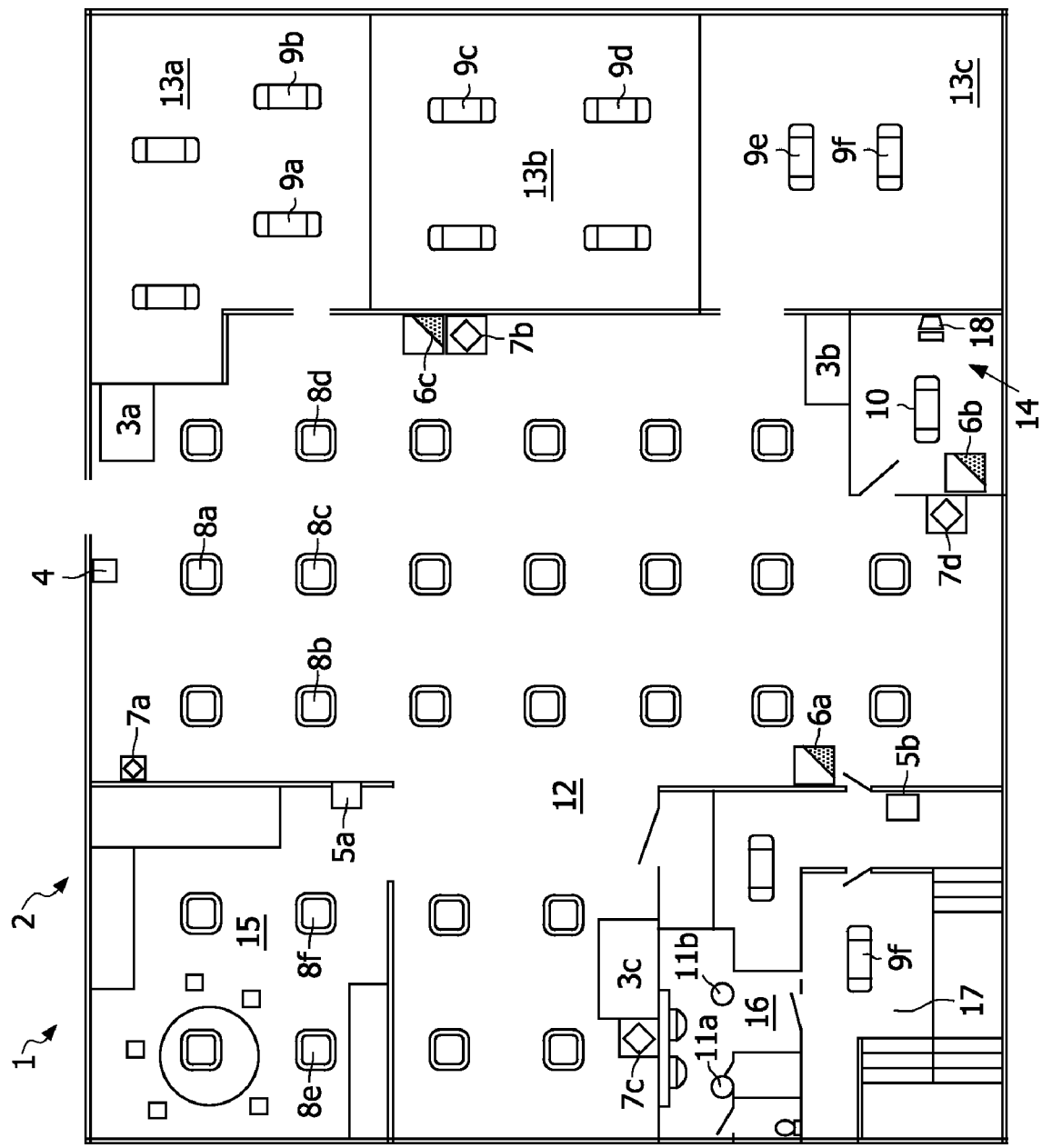
FIG. 1 is a schematic illustration of a building plan for a lighting control system.

A building plan 1 of a lighting control system 2 is shown in FIG. 1. The system includes a number of gateway devices 3a to 3c, switches 4, 5a, 5b, 6a-6c, presence detectors 7a to 7d and luminaires 8a to 8f, 9a to 9f, 10, 11a and 11b, which are configured to communicate with each other in a wireless network. The gateways 3a to 3c also include functionality for connecting the wireless network to an external network. The system may extend over a number of floors but only the devices located on a single floor are shown in FIG. 1.

The building plan shows an office, including an open area 12, a number of personal offices, 13a to 13c, a server room 14, a kitchen 15, a toilet 16 and a hallway 17 including a staircase. The devices in the system are of a large number of different types, defined by, for example, their functionality, make, model and number of end-points. An end-point is a component of a device that needs to be controlled separately from the other components in the system, for example, a number of light bulbs connected together, or a component that controls other end-points, for example a number of buttons on a switch device. The different types of devices in the system are indicated with a different number, whereas devices of the same type are indicated with a different letter of the alphabet.

The switches in the system 2 come in three different types, a switch 4 at one of the entrances to the floors, which can be used to switch on and off the lights located on that floor, two switches 5a and 5b in the kitchen and in the staircase respectively for controlling the lights in the kitchen and the staircase and three dimmer switches 6a to 6c located in various locations around the office. Luminaires of different types are also provided including ceiling lights 8a to 8f for the kitchen and the open area, ceiling lights 9a to 9f for the personal offices and the staircase, a special lamp for the server room 10 and two ceiling lights 11a and 11b in the toilet.

Each device of the system comprises a wireless transceiver to allow the device to act as a node in a wireless network. The wireless transceiver may, for example, operate according to the ZigBee™ protocol. According to the ZigBee™ standard, tens of thousands of devices can be wirelessly connected to form a network. However, it may be desirable to divide the devices into a number of separate networks for easier operation. Typically, a separate network for each floor is used. A device operating according to the ZigBee protocol operates in 2.4 Ghz, 915 MGz and/or 868 MHz radio frequency bands; support raw data transfers rates of 250 kilobits per second (kbps), 40 kbps and 20 kbps respectively and have a transmission range typically between 10 and 75 meters. However, in order to lower the prices of the nodes the transmission range may be between 2 and 5 meters. There are three main types of ZigBee device, namely a network controller, a router and an end device. There may be thousands of routers and end devices in a network but only one network controller. The routers can route messages from one node to another. The end devices can only respond to the node that initiated the conversation. The devices of the system that are not connected to the mains may be provided as end devices since end devices require less power and can run on battery. In the system of FIG. 1, at least all the gateways, 3a to 3c, have router capability, but only one of the routers act as a network coordinator.

In an alternative embodiment, the network may be split up into smaller sub-networks wherein each gateway is a coordinator of a sub-network. One of the gateways may then act as the master coordinator.

The wireless transceivers allow the devices of the system to communicate with a central processing device 18 via the gateways 3a to 3c. The central processing device may be a PC or a laptop located in the server room 14. The central processing device can also be located offsite. The central processing device and the gateways are both connected to a Local Area Network (LAN), for example the Ethernet. However, it should be clear that the link between the PC and the gateways can also be wireless, for example as part of a WiFi network, ZigBee network or any other suitable network. Hereinafter the network over which the PC and the gateways communicate will be described as an Ethernet network. However, it should be realised that this is an example only.

Figure 2:
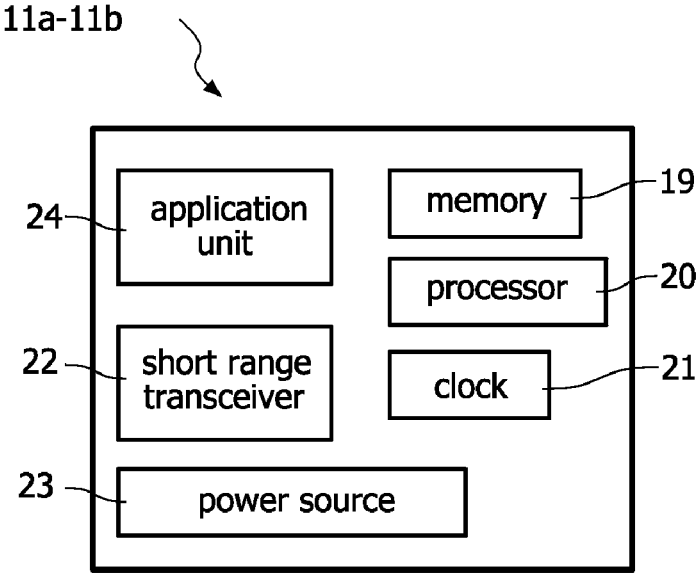
FIG. 2 is a schematic diagram of a luminaire, switch or presence detector of the lighting control system.

With reference to FIG. 2, a device of the system, which could be a switch 4, 5a-5b, 6a-6c, a presence detector 7a-7d or a luminaire 8a-8f, 9a-9f, 10, 11-11b, comprises a memory 19, a processor 20, a clock 21, a short range transceiver 22, operating according to the ZigBee protocol, a power source 23 and a application unit 24. The application unit 24 determines whether the device is a luminaire, a switch, of a presence detector. It also determines which type, for example, the model, make and the number of end-points, of luminaire, switch or presence detector. For example, if the apparatus is a luminaire, the application 24 provides a light source. If the apparatus is a switch, the application unit provides the switching functionality and if the apparatus is a presence detector, the application unit 19 provides the detecting functionality.

The instructions and settings for operating in the system, such as for example, the IDs of the luminaires that a switch controls if the device is a switch, are stored in the memory 19 of the device. However, it is possible that the gateway may store most of the instructions and perform most of the processing for a device if, for example, the device is subject to power restrictions. The processor may be a microprocessor. However, any suitable processor could be used. The power source is either a battery or a connection to the mains depending on the type and location of the device.

Figure 3:
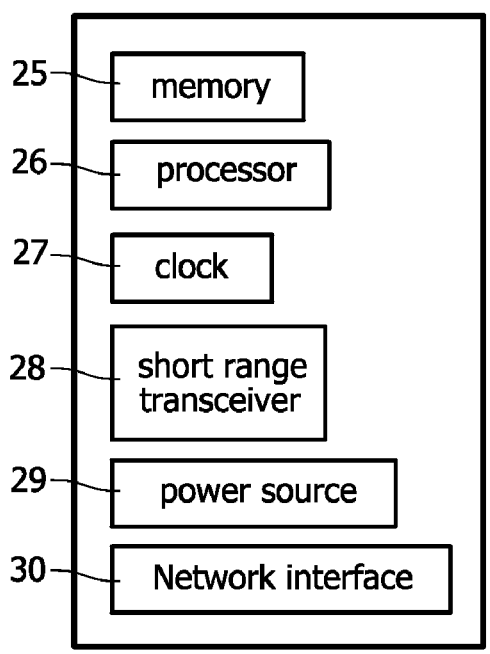
FIG. 3 is a schematic diagram of a gateway of the system.

With reference to FIG. 3, a gateway 3a-3b also comprises a memory 25, a processor 26, a clock 27, a short-range transceiver unit 28 and a power source 29. However, the memory of the gateway and the processing power of the processor is likely to be better than the memory and the processing power of the device shown in FIG. 2, since the gateway has to handle and process information for a plurality of nodes. The power source is typically a connection to the mains. The gateway also comprises a network interface 30 for connecting to the Ethernet.

Figure 4:
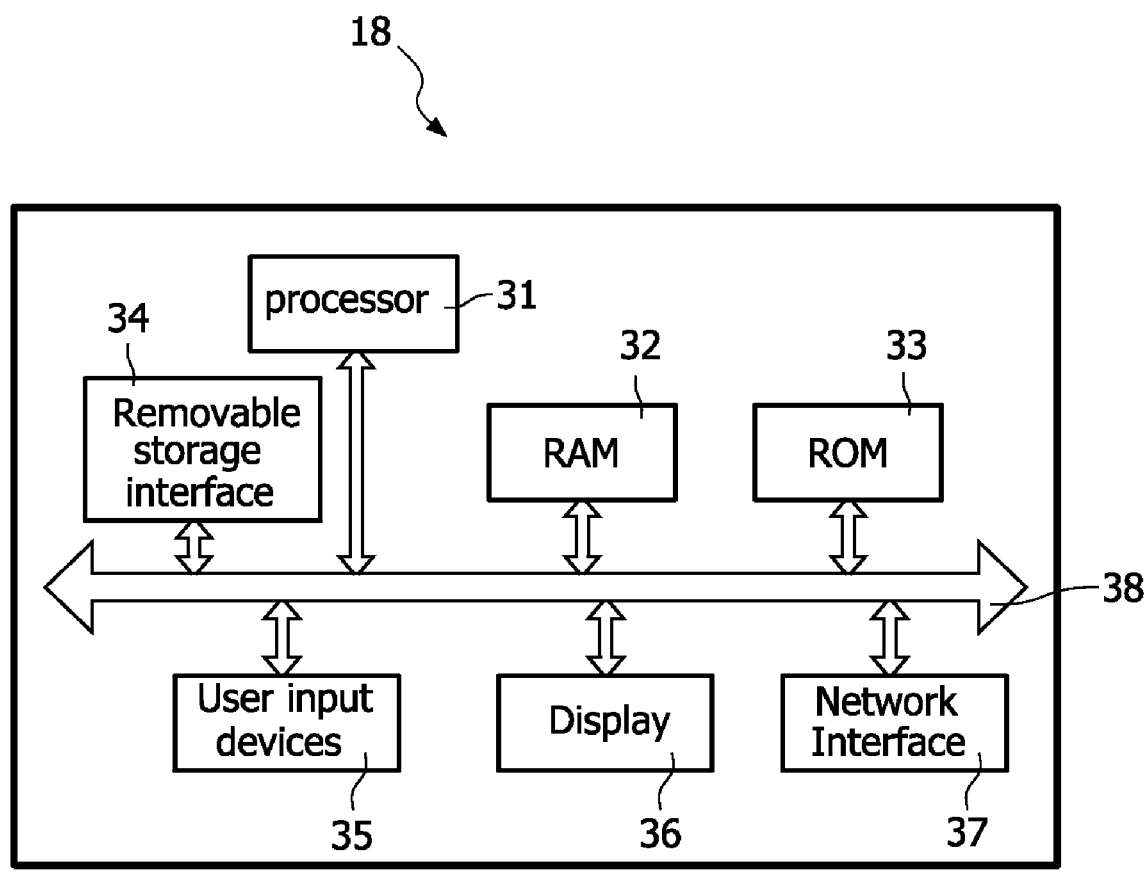
FIG. 4 is a schematic diagram of a central processing device for controlling the lighting control system.

Referring to FIG. 4, a central processing device in the form of a personal computer comprises a processor 31 connected to memory 32 such as a Random Access Memory (RAM) and storage 33 such as Read Only Memory (ROM). The processor 31 also connects to a removable storage interface 34, for example, a CD drive or a floppy disk drive. The processor receives user instructions from one or more user input devices 35, such as a mouse or a keypad, and it communicates information to a user using a display 36. The processor may also connect to a network interface 37 such as an Ethernet Network card reader. The processor, the memory, the storage, the removable storage interface, user input devices, display and network interface all communicate with each other using a bus 38.

Depending on the type of room in which a device is installed, the time of the day and the season, different functionality of the device may be required. For example, at the time of installation, the ceiling lamps in the kitchen 8e, 8f may be configured to come on in response to the presence detector 7a detecting people in the open area 12 of the office. However, at a later date the ceiling lamps may be re-configured to be controlled only by the switch 5a in the kitchen 15. Moreover, from 8 am to 6 pm on working days the lights in the hallway may be constantly on but after 6 pm they may be configured to come on only when switch 5b is operated and then only for a period of ten minutes before switching off again.

The functionality can be specified using the computer program run on the computer 18 in the server room 14. Alternatively, the functionality can be specified in another location and transferred to the computer using the removable storage interface 34 or the network interface 37 of the computer 18. The program may also run algorithms for automatically deriving the clusters of the system, for example, which luminaires are controlled by a particular switch. The instructions for implementing the functionality are sent from the computer 18 to the devices in the network via Ethernet and the gateways 3a-3c.

Figure 5:
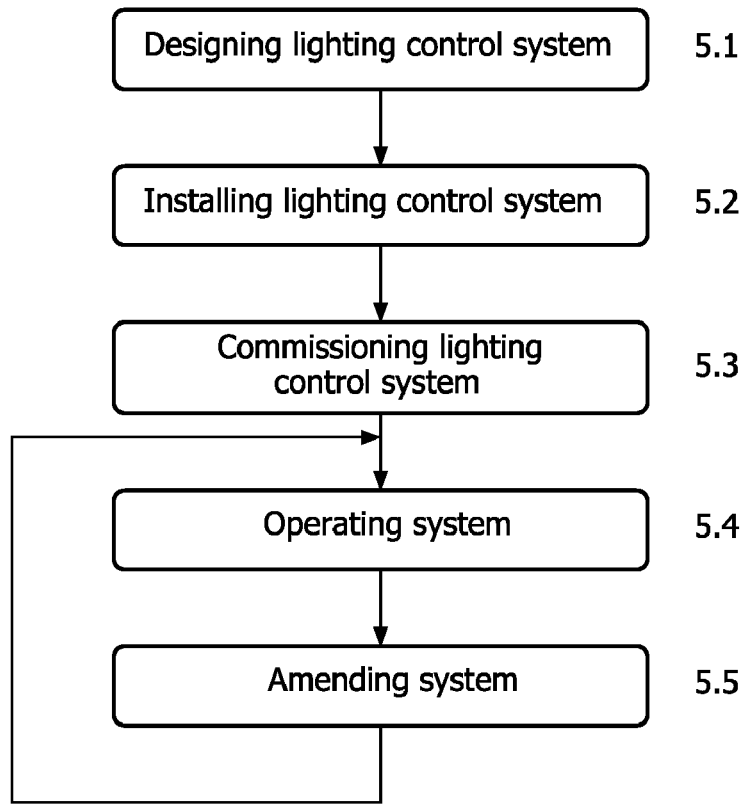
FIG. 5 illustrates the procedures associated with a lighting control system.

With reference to FIG. 5, the processes associated with the lighting control system includes designing the system 5.1, installing the system 5.2, commissioning the system 5.3, operating the system 5.4 and amending the system 5.5. After the system has been amended, the system can be operated again 5.4 as amended.

Typically, a single software suite is used for all the processes of FIG. 5. The program typically also provides a graphical user interface for allowing the user to interact more easily and intuitively with the devices and the data stored in the system. The software may be based on conventional software such as AutoCAD™ or LonMaker™. The designing of the system may include importing an architectural drawing of the building into the graphical user interface and defining the location of the devices with respect to the architectural drawing. A coordinate system may then be established with respect to the drawings and the coordinates of each device may be calculated. The functionality may be manually defined for each device using the graphical user interface and/or automatically defined using algorithms that form part of the software suite. For example, the algorithm may identify the luminaires located closest to a particular switch or presence detector and establish links between the luminaires and the switch/presence detector. Installing the system includes an engineer installing the devices according to the building plan. After the devices have been installed, the system can be commissioned. The commissioning process will be described in more detail below with respect to FIGS. 6 to 11. When the commissioning process is completed, the system can be operated. The instructions and settings are stored in the gateways and the wireless network can operate independently of the data and programs stored in computer. However, the software suite is used to amend the functionality of the operating system, if required at later date. For example, some of the devices may be moved and so new instructions may be required to provide the functionality required in the new location. Moreover, the system may also be updated to provide new functionality. After the amendments have been made, the new instructions are sent to the network and the network can continue to operate as amended.

The process of commissioning the system will now be described with reference to FIGS. 6 to 11. The commissioning process typically starts after all the devices have been installed. An engineer located either on or off site starts the commissioning process. It is preferred that the engineer is located on site to manually solve any problems that might occur. However, it is also possible that the engineer can commission the system remotely by connecting over, for example, a LAN or the Internet to a computer 18 onsite. A program for commissioning and controlling the lighting system is used by the engineer to commission the system. Hereinafter, the program along with any records and settings will be described to be loaded on the computer 18 on site. However, it should be understood that the program could also be run on a remote computer connected to the computer 18 onsite, or possibly by a supervisory network node such as a gateway device.

Figure 6:
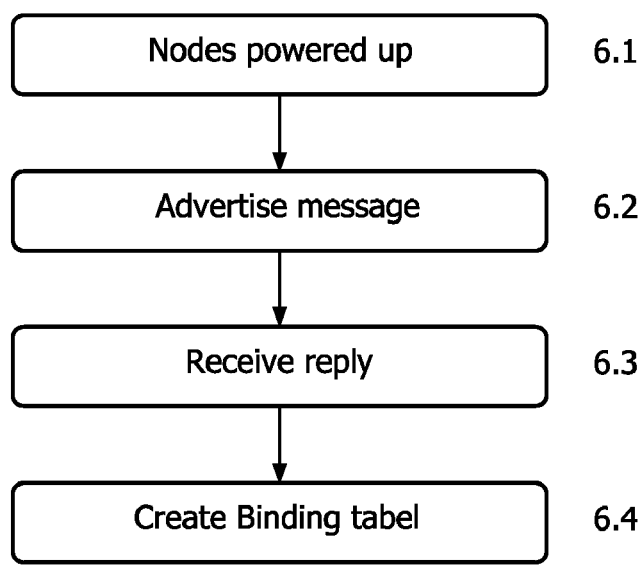
FIG. 6 illustrates a discovery process of the nodes of the lighting control system.

Referring to FIG. 6, the nodes are powered up at step 6.1. This is normally performed by switching on the power to the system, which can be done either manually or using the graphical user interface of the computer program for controlling the system. On power up, all nodes turn to a control channel and a discovery process is initiated. At step 6.2, each node sends a message to "advertise" its presence. The message contains the type, including for example the functionality and number of end points, and the ID of the node from which the message originated. The message also includes a request for other nodes to identify themselves. Each node replies at step 6.3 after a randomly selected period of time with its identity, functionality and number of endpoints. Each node then creates a binding table of all available nodes and the type of those nodes at step 6.4. It is quite likely that a particular node is not able to contact all nodes in the system directly, since some of the nodes may be out of range. However, all nodes forward data about their neighbouring nodes and the optimum route for contacting a specific node can be determined using this data. After the binding tables have been compiled, the nodes typically continue to send new discovery messages at regular intervals in case new nodes appear.

Referring now to FIGS. 7 and 8, after the discovery process, which normally only takes a number of seconds, the commissioning engineer inputs an instruction at step 7.1 in the system to start the process of matching the signals from the physical devices to the stored devices in the database. The instruction triggers the computer running the computer program to send a request to one of the gateways, 3a, 3b or 3c, of the system as shown in FIG. 8 to obtain a description of the network. The gateway responds with the IDs, functionality and number of endpoints of each node in the network at step 7.2. The program then compares the number and types of devices with the number and types indicated by the building plan at step 7.3. If all devices are not accounted for, an error message may be output to the engineer.

If all devices are accounted for the program then compiles a list of nodes as reported by the network including the ID and the type of the nodes. For example, the list may be in the order of ascending IDs. At step 7.4, the program selects a first node in the list of nodes and transmits a request for range measurements for that node. The request is received by the gateway and forwarded to the node concerned at step 7.6 as shown schematically in FIG. 8. The node performs range measurements with all the other nodes of the system located within its transmission range at step 7.6 in response to receiving the request. In all but very large networks, a node may be within the transmission range of all other nodes in the network. Accordingly, the range measurements between the node and all the other nodes in the network may be obtained.

Range measurements can be performed in a number of ways and will not be described in detail herein. One common way includes measuring the time of transmission of a signal from a first node and the time of arrival of the signal at a second node. The distance between the nodes can then be calculated by multiplying the time between the time of arrival and the time of transmission by the speed of light. The measurement can be improved and corrected for any time delay between the clocks 21, 27 of the two nodes by also measuring the time it takes for a second signal transmitted from the second node to the first node and averaging the two measurements. Any time delay between the clocks will then be cancelled out. Another known way of obtaining range measurements in wireless systems includes measuring the power of a signal when it is received. The attenuation of the power of the signal is related to the distance the signal has travelled.

The nodes calculate the range to each of their neighbours using any well-known method at step 7.7 and transmit the range measurements to the gateway at step 7.8 as shown in FIG. 8. If a node has reduced processing capability it may transmit the measured data to the gateway and the gateway will calculated the distances between the nodes and its neighbours.

At step 7.9, a signal indicating the distances between the selected node and its nearest neighbours is transmitted to the computer 18. When the computer receives the range measurement it creates a table wherein the first column and the first row of the cable include the lists of IDs and types of the nodes in the network. The range table is then updated at step 7.10 with the range measurements, i.e. the range measurement between a first node and a second node is provided at the intersection of the row including the ID of the first node and the column including the ID of the second node. An example of a part of such a table is schematically shown in FIG. 9 and will be described in more detail below.

The computer thereafter compares the number of the selected node with the total number of nodes in the list determined at step 7.3. If the number of the node is smaller than the total number of nodes, the process continues to step 7.12 and n is incremented by 1. Steps 7.5 to 7.10 are then repeated for the next node until range measurements for all nodes have been obtained and stored in the table of FIG. 9. FIG. 8 only shows the range measurements performed by one node, i.e. the range measurements performed as a result of a single iteration through the loop defined by steps 7.5 to 7.12 of FIG. 7. Each time the system repeats the loop, the range measurements between a new node and all its neighbours are calculated.

Since all nodes perform range measurements, the distance between two nodes are determined twice, both on a request to the first node and on a request to the second node. This ensures that all measurements can be checked and errors can be detected. For example, it is contemplated that if the two measurements do not match, the measurements are repeated.

When it is determined at step 7.11 that range measurements for all nodes have been obtained, the process continues to step 7.13 and the program creates a table corresponding to the table of FIG. 9 but comprising values for the distances between the nodes calculated from the building plan rather than based on the range measurements in the wireless system. An example of part of such a table is shown in FIG. 10. The nodes are ordered in dependence on their type. The two tables are then compared at step 7.14 to match the IDs of the devices in the first table with the devices indicated in the building plan and included in the second table. The comparison typically includes two main processes. Firstly, an initial number of reference nodes are established. Secondly, the coordinates of all the remaining nodes with respect to the coordinates of already matched nodes are obtained. It is possible that in some systems, the method used for establishing the initial number of reference nodes can be used to match all the nodes in the system. In that case, the second main process is never performed.

The tables of FIGS. 9 and 10 will now be described in more detail. As described above, the table of FIG. 9 comprises a first column listing the IDs and the types of the devices of the system and a first row also listing the IDs and the types of the devices of the system. The rest of the table then lists the distances between respective devices of the system as indicated by the range measurements. The order the nodes are listed in the table may depend on how the data for each node was received at the computer 18. For example, it is likely that they are listed in the order of ascending ID. The type of the devices is also included. In FIG. 9 the type is indicated with the reference number used in FIG. 1, i.e. 3 indicates a gateway, 4, 5, 6 indicates different types of switches, 7 indicates a presence detector and 8, 9, 10 and 11 indicate different types of luminaires.

The table of FIG. 10 comprises a first column listing the reference numbers of the nodes indicated on the building plan stored in the system and a first row also listing the numbers of each node in the plan. The rest of the table then lists the distances between respective devices in the system as calculated from the building plan. The nodes are listed in the order of the reference numbers of the building plan, i.e. first all the gateways are listed, then all the switches, then the presence detectors and finally all the luminaires.

The tables of FIGS. 9 and 10 do not include measured or calculated ranges between all the nodes. If two nodes are out of transmission range, an X is shown in the table instead of the distance between the two devices. In other embodiments, algorithms are used for calculating the distance between two devices not in direct communication with each other and the distances between the devices are also stored in the table.

According to the invention, the method for matching the nodes in the table of FIG. 9 with the nodes in the table of FIG. 10 comprises establishing reference nodes in the system. As the positions of unknown devices are established, these devices can then be used as reference points for finding the position of further devices.

The process for establishing the initial reference nodes includes identifying nodes that have unique characteristics.

For example, if the system includes a single node of a specific type, then that node can easily be identified in both the tables of FIGS. 9 and 10 and the nodes can be matched up. With reference to FIG. 11, the algorithm for establishing reference nodes in the system is reset at step 11.1, i.e. the number of reference nodes is set to zero. At step 11.2, the software for commissioning the system analyses the building plan and identifies a node of a unique type in the system, for example the switch 4 located at the entrance to the floor. The system then analyses the information stored in the table of FIG. 9 at step 11.3 and identifies a node of the same type as node 4 in the building plan. The information in the table of FIG. 9 also includes the unique ID for that particular node, i.e. 106. The system copies the ID from the table of FIG. 9 at step 11.4 and stores the ID in the record for node 4 in the program at step 11.5. Consequently, a first reference node has now been established and n is incremented by 1 at step 11.6.

At step 11.7, the system checks whether n is smaller than the total number of nodes N in the system. If n is equal to or larger than the N all the nodes in the system have been matched and the system proceeds to step 11.8 where the process for matching the nodes ends. Conversely, if n is smaller than N, the system returns to step 11.2 and a check is carried out to determine whether there are any additional nodes of unique types in the system.

If at step 11.2 it is determined that there are more nodes in the system with unique types, steps 11.3 to 11.7 are repeated until all nodes with unique types are found and the IDs of the nodes are stored in the corresponding records for the nodes. In the system of FIG. 1, there is one other node apart from node 4 of a unique type, namely node 10. Node 10 is the only luminaire of that type. From the table of FIG. 9, it is clear that the ID of the node of type 10 is 109. This ID is therefore stored in the record for lamp 10 in the system at step 11.5.

If at step 11.2, it is determined that there are no more devices of a unique type in the system, the system proceeds to step 11.9. The system now determines whether there are any two devices in the system in a relationship that is unique. For example, presence detector 7c is the presence detector in the network that is located closest to a gateway, namely gateway 3c. In more detail, the calculated distances between the devices in the table of FIG. 10 indicate that the first presence detector 7a is 5.20 m away from a gateway 3a, the second presence detector 7b is 5.73 m away from a first gateway 3a and 6.50 m away from a second gateway 3b, the third presence detector 7c is 0.10 m away from a gateway 3c and the fourth presence detector is 2.50 m away from a gateway 3b. Even if there are errors in the range measurements, it should be easy to differentiate between a presence detector being 0.1 m from a gateway and the presence detectors being 2.5 m or further away from a gateway. Consequently, nodes 7c and 3c should be easy to identify from the information in the table of FIG. 9. Thus, presence detector 7c and gateway 3c are identified at step 11.10.

At step 11.11, the range measurements and the types of the devices listed in FIG. 9 are analysed to find presence detector 7c and gateway 3c. It is realised at step 11.10 that the presence detector with ID 108 is 0.10 m away from the gateway with ID 111. Consequently, the system deduces that the node with ID 108 must correspond to presence detector 7c and the node with ID 111 must correspond to gateway 3c. ID numbers 108 and 111 are therefore stored in the records of presence detector 7c and gateway 3c respectively at step 11.12. The number of reference nodes found is then incremented by 2 at step 11.13.

At step 11.14, it is checked whether the number of reference nodes already established is smaller than the total number of nodes in the system. If the number of reference nodes established is smaller than N, the process returns to step 11.8. If the number of reference nodes established is equal or higher than N, the process ends at step 11.8.

At step 11.9, it is determined whether there are any other pairs of devices with unique relationships. If the system cannot find any more devices with those characteristics, the process continues to step 11.15 and it is determined whether there are any devices with unique range relationships with reference nodes. The building plan of FIG. 1 indicates that one of the presence detectors, namely 7d, is substantially closer to reference node 10 than the other presence detectors 7a-7c. Consequently, it is established at step 11.15 that there are devices in the system with unique distance relationships to reference nodes and node 7d is identified at step 11.16. The information in the table of FIG. 9 indicates that there are four presence detectors in the system, 103, 107, 108 and 113. Moreover the range measurements in FIG. 9 show that two of the nodes, nodes 103 and 108, are outside the transmission range of node 10. Moreover, node 108 has already been established as corresponding to node 7c. Consequently, neither node 103, nor node 108 can correspond to node 7d. One of the remaining nodes, the node with ID 107, is 7.8 m away from node 10, whereas the other remaining node, the node with ID 113, is only 1.2 meters away from node 10. Consequently, even if there are large errors in the range measurements, it is reasonably to assume that the node with ID 113 corresponds to node 7d. The system therefore deduces that node 7d must correspond to the node with ID 113 at step 11.17 and stores the ID in the record for node 7d at step 11.18. At step 11.19 n is incremented by 1 since an additional reference node, node 7d, has now been established.

At step 11.20, if all the nodes have still not been matched, step 11.15 is repeated. Otherwise, the method ends at step 11.8. All the nodes of the system of FIG. 1 have not been matched. Accordingly, the system returns to step 11.15. At step 11.15, it is established that there are additional devices in the system with unique range relationships to reference nodes and steps 11.16 to 11.19 are therefore repeated. As a result, at least dimmer switch 6b, gateway 3b and gateway 3a are established as reference nodes. Dimmer switch 6b and gateway 3b are the dimmer switch and the gateway closest to reference node 10. Moreover, gateway 3a can be identified since it is the gateway that is far closer to reference node 4 than any of the other gateways.

Next time the system arrives at step 11.15, it may be realised that there are no more devices in unique relationships with any of the reference nodes. The system then proceeds to step 11.21 and the process for establishing the coordinates of the rest of the nodes with respect to the reference nodes is then started. The remaining nodes may not be in a clearly and unmistakable unique relationship to a specific reference node. However, by comparing the actual range measurements to the calculated range measurements between a node and a number of established reference nodes, the node to be matched. The system has established 8 reference nodes, namely the nodes with ID nos. 106 (4), 109 (10), 108 (7c), 111(3c), 113(7d), 115(6b), 114(3b) and 105 (3a). Using these reference nodes, the coordinates of the rest of the nodes in the system can then be established. As soon as the coordinates of a new node are found, it can be used as a reference node to match the remaining devices.

The method of establishing coordinates of a node with reference to nodes with known coordinates is known in the art and will not be described in detail herein. Typically, for each node, the range measurements to at least four reference nodes are required. The system computes a sphere around each of the four nodes, the surface on which the node can be located. The coordinates of the nodes are found where the spheres intersect. If all the nodes are at ceiling height, only three range measurements are required. Moreover, in some circumstances only two range measurements are needed. For example, with reference to FIG. 12, the range measurements between node 4 (ID 106) and the node with ID 101 shows that the node with ID 101 can be anywhere on the sphere 39 around node 4. Moreover, the range measurements between node 3a (ID 105) and the node with ID 101 shows that the node with ID 101 must be somewhere on the surface of the sphere 40 around node 3a. Spheres 39 and 40 intersect on a circle 41, however only one lamp is located on this circle, namely the luminaire indicated as 8a in the building plan. Consequently, the node with ID 101 must correspond to node 8a. Moreover, the calculated coordinates of node 8a are known and consequently, these must be the coordinates of node 101.

Referring now to FIG. 13, an example of a graphical user interface for commissioning, updating and operating the lighting control system may comprise a number of menus and buttons 42, a main view 43 for showing the building plan, and a smaller view 44 listing the current processes that are being run by the system. The building plan 1 is shown in the main view 43 and a hatched outline of a circle is shown around each node that has been matched in the building plan. The graphical user interface may provide a circle around each device that has been identified as and when it is identified. Consequently, the user can check the progress of the commissioning steps. Clicking on a node in the system further triggers a menu 45 to open up providing the user with options for cutting, copying, configuring and changing the settings for the device.

One of the menu options in the top menu includes a menu for commissioning the system. Clicking on the menu may reveal a submenu (not shown) for initiating and running the separate process of the commissioning process. Alternatively, or additionally, all the processes may be triggered in sequence as a result of selecting one of the options in the submenu. The current process being performed is shown in the bottom window 44.

It should be realised by the skilled person that although the invention has been described with respect to a lighting control system comprising devices operating according to the ZigBee standard, the invention may be implemented in any wireless network comprising devices to be matched with information associated with corresponding devices in a building plan of such devices stored in a computer system and that the devices can operate according to any suitable wireless protocol.

Although claims have been formulated in this Application to particular combinations of features, it should be realised that the scope of the disclosure of the present invention also includes any novel features or any novel combination of features disclosed herein either explicitly or implicitly or any generalisation thereof; whether or not is relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A method for commissioning a plurality of devices according to a plan comprising the steps of:
providing a plan comprising a plurality of planned devices corresponding to a plurality of installed devices;
identifying a planned device in the plan having a unique characteristic compared to the other devices in the plan;
receiving data comprising characteristics of an installed device from the wireless network;
comparing the received characteristics to the unique characteristic; and
in response to the received characteristics including the unique characteristic, matching the installed device with the planned device.

2. A method according to claim 1, wherein the plan comprises a record for each planned device of said plurality of planned devices indicating the coordinates of that device in a coordinate system.

3. A method according to claim 2, wherein the received data includes a unique ID of said installed device and wherein the method further comprising storing the unique ID in the record of the planned device.

4. A method according to claim 1, wherein the unique characteristic comprises a unique type of the planned device or a unique distance range to another installed device in the wireless network.

5. A method according to claim 4, wherein the received data from said installed device includes the type of said installed device and the range measurements between said installed device and neighboring devices of said installed device.

6. A method according to claim 5, wherein the range measurements have been obtained by analyzing signals sent from the installed device to its neighboring installed devices and/or signals sent from the neighboring devices to the installed device.

7. A method according to claim 5, wherein type includes at least one of the make, model and number of end points of said installed device.

8. Apparatus comprising:
means for connecting to a wireless network;
a memory configured to store a predetermined plan comprising a plurality of planned devices in said wireless network;
means for identifying, from said plurality of planned devices, a planned device having a unique characteristic compared to the other planned devices in the plan;
means for receiving data comprising characteristics of an installed device from the wireless network;
means for comparing the received characteristics to the unique characteristic; and
means for matching the installed device to the planned device if the received characteristics include the unique characteristic.

9. Apparatus according to claim 8, wherein the plan of devices includes a record for each planned device indicating the coordinates of each planned device in a coordinate system.

10. Apparatus according to claim 9, wherein the received data includes a unique ID of said installed device and wherein the means for matching are operable to store the unique ID in the record of said installed device.

11. Apparatus according to claim 8, wherein the unique characteristics comprises a unique type of the planned device or a unique distance range to another planned device in the wireless network.

12. Apparatus according to claim 8, wherein the received data from said installed device includes the type of said installed device and the distance measurements between said installed device and the neighboring devices of said installed device.

13. Apparatus according to claim 8, wherein the wireless system comprises a lighting system.

14. Apparatus according to claim 8, wherein the wireless system is a home automation network.

15. A system comprising:
- an apparatus comprising
  - means for connecting to a wireless network;
  - a memory configured to store a predetermined plan comprising a plurality of devices in said wireless network;
  - means for identifying from said plurality of devices a planned device having a unique characteristic compared to the other devices in the plan;
  - means for receiving data comprising characteristics of an installed device from the wireless network;
  - means for comparing the received characteristics to the unique characteristic;
  - means for matching the installed device to the planned device if the received characteristics include the unique characteristic; and
- a plurality of devices in said wireless network, the plurality of devices comprising at least one gateway controller configured to communicate with said apparatus.

16. A system according to claim 15, wherein said at least one gateway controller is operable to communicate with said apparatus over a LAN link.

* * * * *